C. L. SHEPPY & J. R. WAY.
DASH CONSTRUCTION FOR MOTOR VEHICLES.
APPLICATION FILED SEPT. 13, 1912.
1,048,900.
Patented Dec. 31, 1912.
2 SHEETS—SHEET 1.
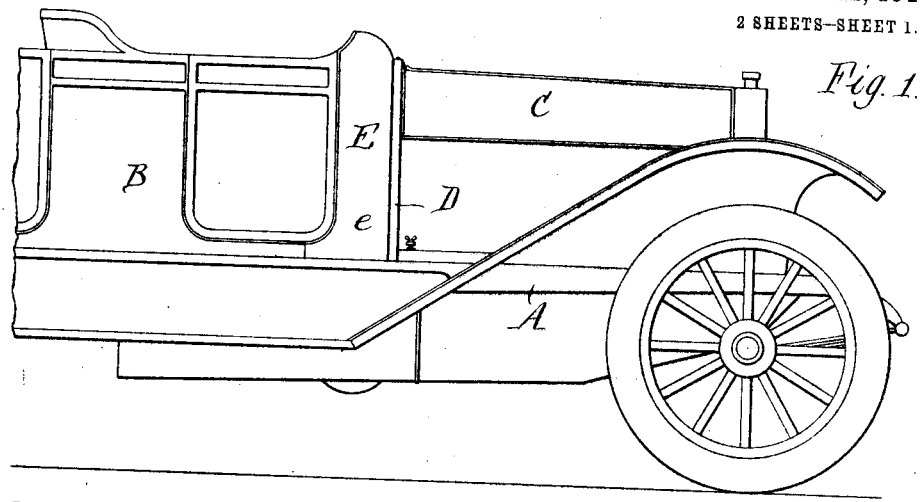
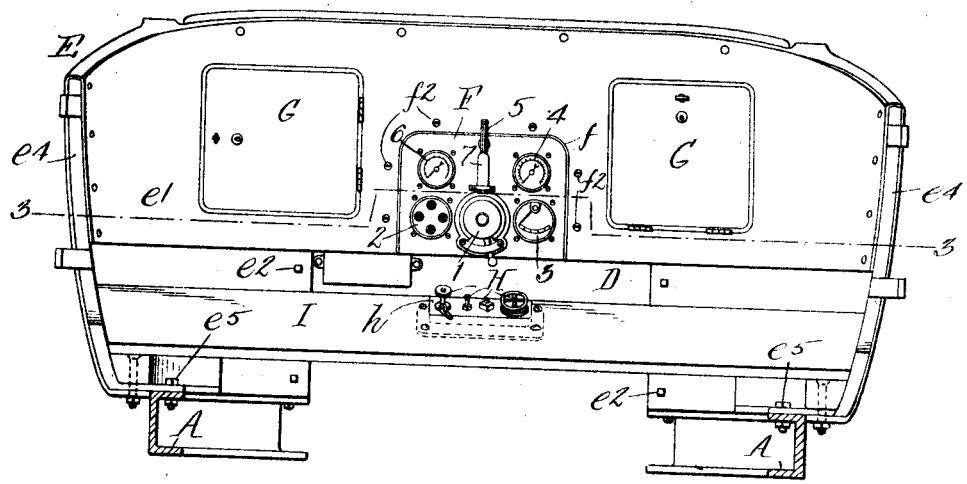
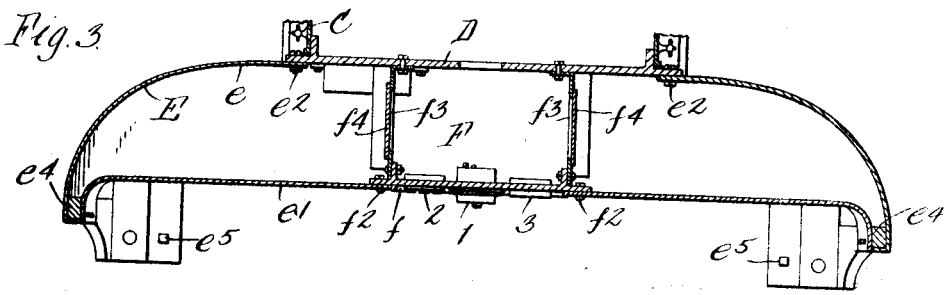
Witnesses.
Inventors
Charles L. Sheppy
and James R. Way
by Wilhelm, Parker & Ward
Attorneys.

C. L. SHEPPY & J. R. WAY.
DASH CONSTRUCTION FOR MOTOR VEHICLES.
APPLICATION FILED SEPT. 13, 1912.
1,048,900.
Patented Dec. 31, 1912.
2 SHEETS—SHEET 2.
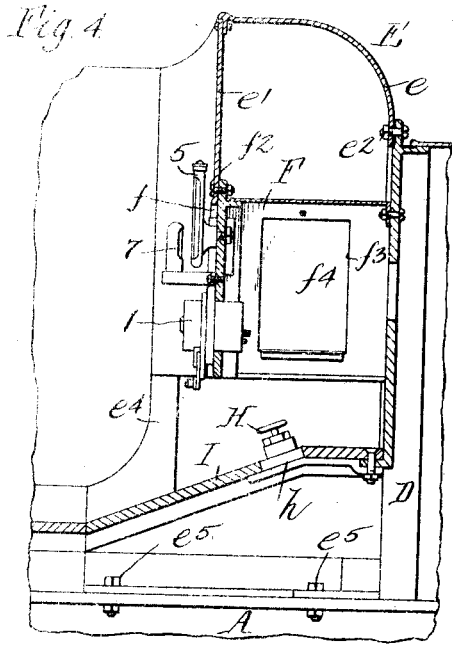
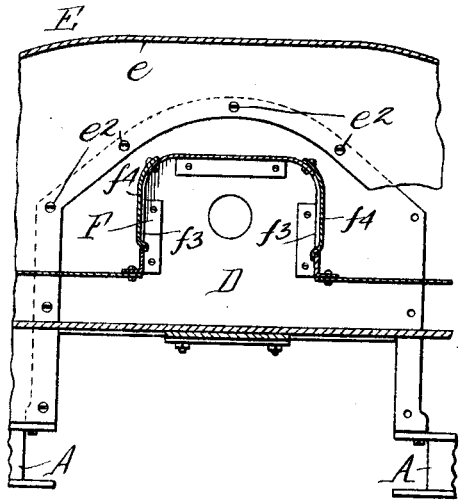
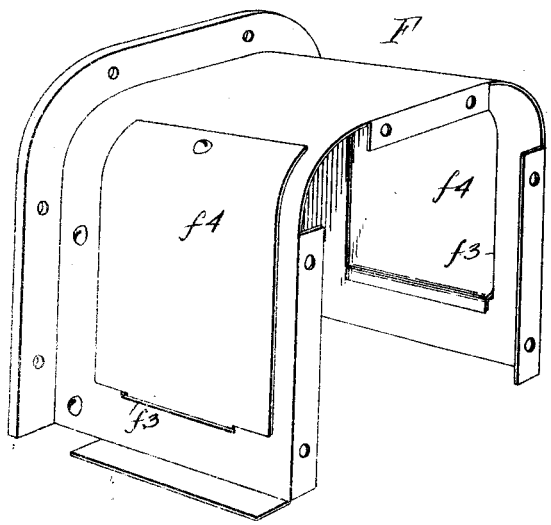
Witnesses
A. G. Dimond
A. Borkenhagen
Inventors
Charles L. Sheppy
and James R. Way
By Wilhelm, Parker & Baird
Attorneys

UNITED STATES PATENT OFFICE.

CHARLES L. SHEPPY AND JAMES R. WAY, OF BUFFALO, NEW YORK, ASSIGNORS TO THE PIERCE ARROW MOTOR CAR COMPANY, OF BUFFALO, NEW YORK.

DASH CONSTRUCTION FOR MOTOR-VEHICLES.

1,048,900. Specification of Letters Patent. Patented Dec. 24, 1912.

Application filed September 13, 1912. Serial No. 720,144.

*To all whom it may concern:*

Be it known that we, CHARLES L. SHEPPY and JAMES R. WAY, citizens of the United States, residing at Buffalo, in the county of Erie and State of New York, have invented a new and useful Improvement in Dash Constructions for Motor-Vehicles, of which the following is a specification.

This invention relates to dash constructions for motor vehicles and has for one of its objects to provide a construction comprising a chassis dash which is a permanent part of the chassis and on which the various dash instruments or appliances necessary to the control or operation of the car are mounted; and an ornamental or body dash which is separable from the chassis dash and is adapted to be removed without disturbing the instruments or appliances mounted on the chassis dash. Thus the chassis can be built complete with the necessary dash instruments or appliances in place on the permanent chassis dash, and a body builder can supply a body of any desired style and an appropriately finished body dash without disturbing the dash instruments or their connection with the operating mechanism of the car; and one body dash can be readily replaced by another when it is desired to change the car bodies.

Another object of the invention is to construct and arrange the body dash with reference to the chassis dash, so as to provide an inclosed space suitable for the storage of tools and other small articles.

In the accompanying drawings, consisting of two sheets: Figure 1 is a fragmentary side elevation of a motor vehicle provided with a dash construction embodying the invention. Fig. 2 is an elevation partly in section of the dash as seen from the driver's seat. Fig. 3 is a horizontal section thereof in line 3—3, Fig. 2. Fig. 4 is a longitudinal sectional elevation on an enlarged scale thereof. Fig. 5 is a transverse sectional elevation thereof. Fig. 6 is an enlarged perspective view, detached, of the instrument case.

Like reference characters refer to like parts in the several figures.

A represents the side bars of the chassis or underframe of a motor vehicle, B the vehicle body and C the hood at the front of the vehicle which covers the engine, these parts being of any usual or suitable construction.

D represents the chassis dash and E the ornamental or body dash. The chassis dash extends transversely across the vehicle, as usual, between the front end of the body and the rear end of the hood C, and may be secured in place on the frame in any suitable manner. As shown it consists of an upright metal plate conforming in outline to the cross sectional shape of the hood C by which it is securely held in place on the frame. The body or ornamental dash is in the nature of a cowl or hood having spaced front and rear walls $e$ and $e'$, respectively, joined by connecting portions at the top and side portions of the dash. The front wall is removably secured by bolts $e^2$, or other suitable fastenings to the edge portions of the chassis dash, and as shown in the drawings, the side portions thereof curve laterally and rearwardly and the upper portion curves upwardly and rearwardly from the chassis dash toward the rear wall, thus giving the side and top portions of the body dash the ordinary convexed or rounded shape. The side edges of the front and rear walls are connected by bars $e^4$ which constitute the front portion of the fore-door frame. The rear wall $e'$ of the body dash preferably terminates far enough above the foot board of the vehicle to allow ample foot space for the occupants of the front seat of the car. The body dash is also removably fastened at the lower edges of its side portions to the chassis or underframe by suitable securing bolts or devices $e^5$, see Figs. 2 and 4, F represents an instrument box or case for the ignition switch, gages and other instruments or appliances which are ordinarily mounted on the automobile dash. This case is securely fastened in any suitable way on the chassis dash and extends rearwardly therefrom to the rear wall $e'$ of the body dash, which is provided with an open bottomed opening $f$ through which the instruments or appliances on the rear wall of the case F project and are exposed to view. The edges of the opening $f$ in the rear wall of the body dash are preferably secured to the edges of the rear wall of the instrument case by screws $f^2$ or other removable fastenings, so that the rear wall of the instrument case F forms in effect a panel in the rear wall of the body dash and the instruments mounted on the case have the same location and appearance as if mounted directly on the rear wall of the body dash. This construction, however, permits the body dash E to be detached from the chassis dash D and the case F and removed leaving the instruments in place and undisturbed on the chassis dash The dash instruments shown in the drawings consist of a switch for the magneto and battery ignition system, a switch 2 for lighting, a voltmeter 3 for the battery and the lighting generator, a pressure gage 4 for the compressed air starter for the engine, a gage 5 that shows the height of the gasolene in the gasolene tank, an indicator 6 for the oiling system, and an electric lamp 7 for illuminating this group of instruments at night. This invention, however, is not limited to the character or number of the instruments mounted on the case, and any instruments or appliances necessary to the control or operation of the car can be provided. Openings $f^3$ closed by suitable covers or doors $f^4$ are preferably provided in the sides of the instrument case to afford access to the connections (not shown) for the instruments mounted on the case.

Doors G are shown in the rear wall of the body dash at opposite sides of the instrument case F to give access to the space between the front and rear walls of the dash, which is ordinarily about six inches deep, so that this space can be utilized for the storage of tools, or any other small articles that it may be desired to carry.

H represents a group of foot plungers and valves arranged beneath the body dash for operating the compressed air starter (not shown) for the motor of the vehicle. These appliances are mounted on a bracket $h$ which is fixed to the chassis dash D, and project therefrom beneath the foot board I so that the parts thereon remain undisturbed when removing the body and body dash.

The described construction and arrangement of the separable dash parts, or body and chassis dashes, enables the vehicle to be furnished with a body dash of any desired design, or the body dash to be removed with the body of the vehicle, while the chassis dash and the various instruments or appliances mounted thereon remain intact on the chassis, and, therefore, obviate the necessity for tampering with any of the connections between these appliances and the operating mechanisms of the car which are carried by the chassis. Nevertheless, the dash instruments or appliances are located in convenient positions at the dash. In addition, the construction provides a convenient storage chamber in the vehicle dash.

We claim as our invention:

1. In a motor vehicle, the combination of a chassis dash, a body dash which is removably secured on the vehicle and is separable from said chassis dash, said body dash having a wall in rear of said chassis dash, and dash instruments supported by the chassis dash adjacent to but independently of said wall of the body dash, whereby said body dash can be removed from the vehicle leaving said instruments in place on the chassis dash, substantially as set forth.

2. In a motor vehicle, the combination of a chassis dash, a body dash which is removably secured on the vehicle and is separable from said chassis dash, said body dash having a wall in rear of and spaced from said chassis dash, an instrument support secured to said chassis dash and projecting therefrom to said wall of the body dash, and dash instruments mounted on said support and exposed in rear of said wall of the body dash, substantially as set forth.

3. In a motor vehicle, the combination of a chassis dash, a hollow body dash which is removably secured on the vehicle and is separable from said chassis dash, said body dash having a rear wall which is spaced from said chassis dash and walls extending from said rear wall to the upper and side portions of said chassis dash, an instrument support secured to said chassis dash and projecting therefrom toward said rear wall of the body dash, and dash instruments mounted on said support with portions thereof exposed in rear of said rear wall of the body dash, substantially as set forth.

4. In a motor vehicle, the combination of a chassis dash, a hollow body dash which is removably secured on the vehicle and is separable from said chassis dash, said body dash having a rear wall which is spaced from said chassis dash and walls extending from said rear wall to the upper and side portions of said chassis dash, an instrument case secured to and projecting rearwardly from said chassis dash to said rear wall of the body dash, and dash instruments mounted on the rear of said instrument case and exposed through an opening in said rear wall of the body dash, substantially as set forth.

5. In a motor vehicle, the combination of a chassis dash, a removable body dash comprising a rear wall located in rear of and spaced from said chassis dash, and walls extending from the upper and side edges of said rear wall and detachably secured to the upper and side edges of said chassis dash, an instrument case mounted on said chassis dash and having a face plate detachably secured to said rear wall of the body dash and exposed through an opening therein, and dash instruments mounted on said face plate of the instrument case, substantially as set forth.

6. In a motor vehicle, the combination of a chassis dash, a removable body dash which is separable from said chassis dash and forms therewith an inclosed chamber, said body dash having a rear wall provided with a door affording access to said chamber, substantially as set forth.

7. In a motor vehicle, the combination of a chassis dash, a removable body dash which is separable from said chassis dash and forms therewith an inclosed chamber extending rearwardly from the chassis dash above and spaced from the floor of the vehicle, said body dash having a rear wall provided with a door affording access to said chamber, substantially as set forth.

Witness our hands this 9th day of September, 1912.

CHARLES L. SHEPPY.
JAMES R. WAY.

Witnesses:
WILLIAM H. LOCKE,
WM. J. PLATT.